United States Patent [19]

Pena

[11] Patent Number: 5,020,262
[45] Date of Patent: Jun. 4, 1991

[54] CAMERA MOUNT FOR RIFLE SCOPES

[76] Inventor: Louis T. Pena, 15523 Barbarossa Drive, Houston, Tex. 77083

[21] Appl. No.: 576,775

[22] Filed: Sep. 4, 1990

[51] Int. Cl.⁵ .............................................. G03B 29/00
[52] U.S. Cl. ..................................... 42/106; 42/101; 354/76; 354/79
[58] Field of Search ......................... 42/103, 101, 106; 434/20; 354/76, 79, 82

[56] References Cited

U.S. PATENT DOCUMENTS

| | | | |
|---|---|---|---|
| 3,545,356 | 12/1970 | Nielsen | 354/79 |
| 3,709,124 | 1/1973 | Hunt | 354/79 |
| 3,911,451 | 10/1975 | Vockenhuber | 354/79 |
| 4,309,095 | 1/1982 | Buckley | 42/103 |

FOREIGN PATENT DOCUMENTS 2619364 12/1976 Fed. Rep. of Germany ........ 354/76

Primary Examiner—Michael J. Carone
Attorney, Agent, or Firm—Neal J. Mosely

[57] ABSTRACT

An apparatus is disclosed which includes a mount for use on a telescope in combination with a rifle. The mount is clamped onto the telescope, and has a camera attached to the top of the mount. A cable mechanism is attached at one end to the shutter release of the camera and at the other end to the trigger of the rifle. The camera is arranged to photograph the image received through the telescope and reflected through the mount. The cable mechanism provides means for controlling the operation of the camera. A housing is clamped onto the telescope and has an eyepiece which fits onto the eyepiece of the telescope and contains a split prism which is positioned in the eyepiece at an angle such that it can be seen through for viewing the image of the target received through the telescope. The split prism has a reflective surface on one side which reflects the image of the target upwardly to a first surface mirror positioned in the housing above the split prism at an angle such that it receives the image reflected from the split prism, and then reflects the image forwardly to a second surface mirror. A second surface mirror is positioned at the forward end of the housing and at an angle that it receives the image reflected from the first surface mirror, and then reflects the image upwardly to the camera lens. The image of the target is photographed when the trigger of the rifle is pulled.

26 Claims, 2 Drawing Sheets

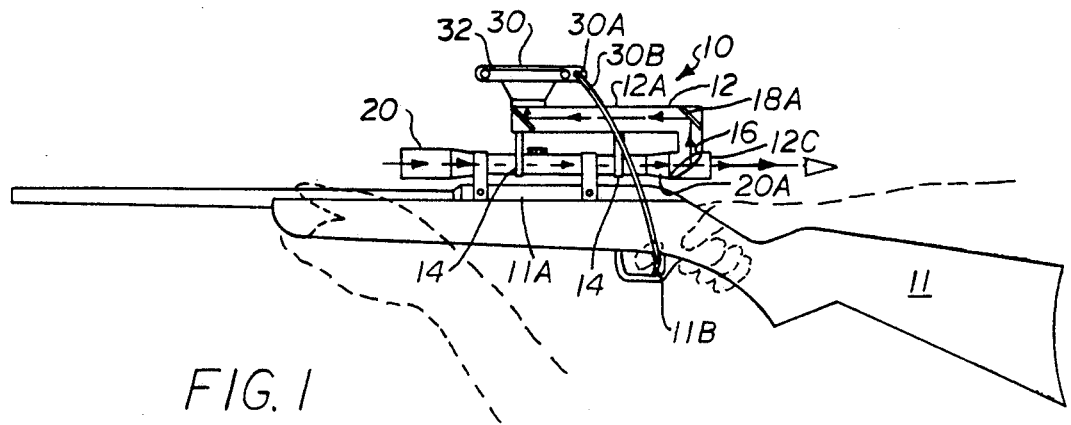
FIG. 1
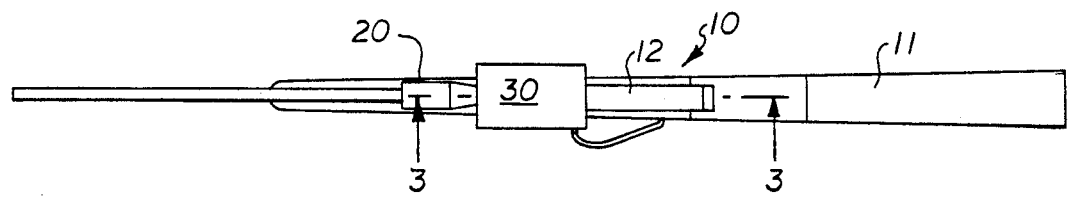
FIG. 2
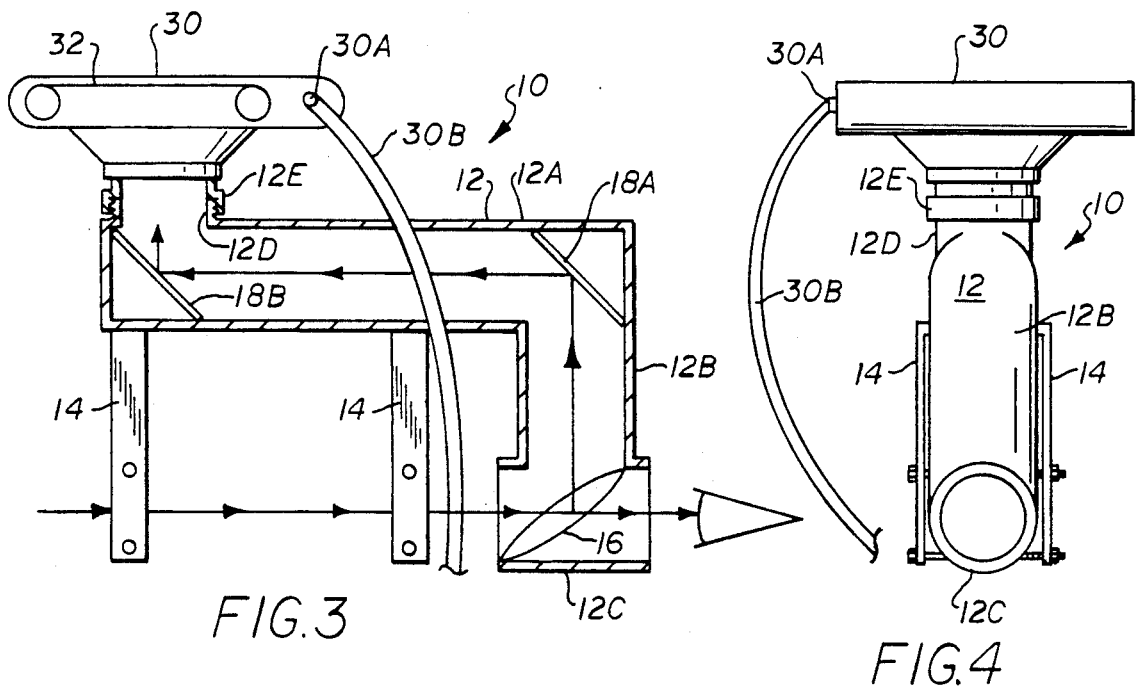
FIG. 3
FIG. 4

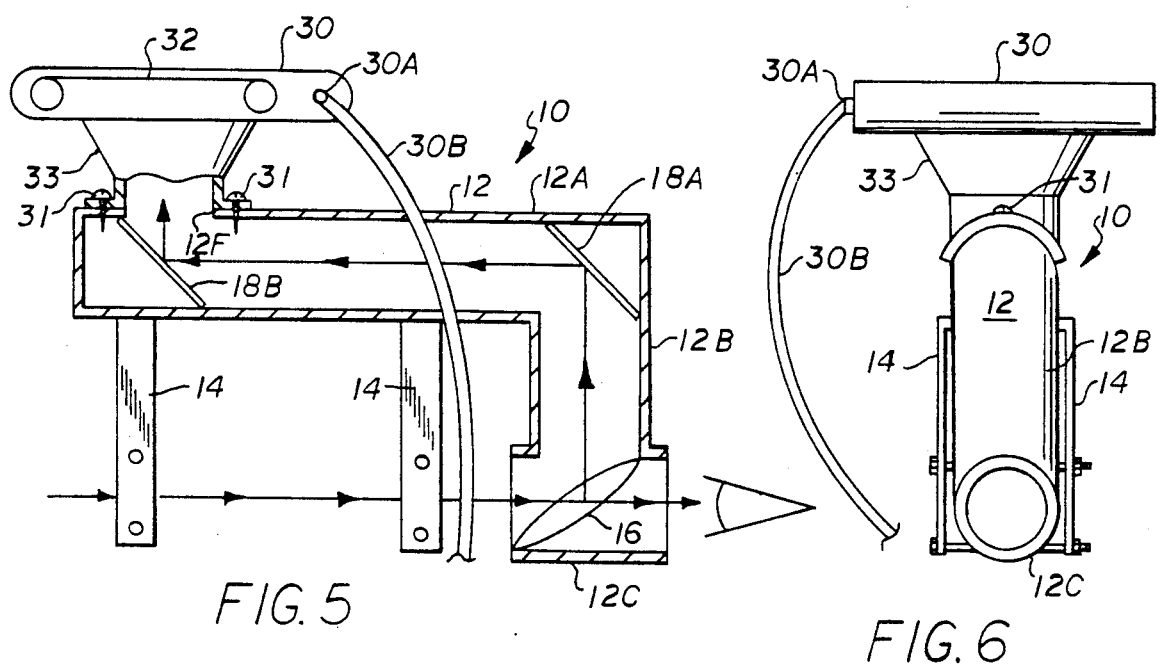

CAMERA MOUNT FOR RIFLE SCOPES

BACKGROUND OF THE INVENTION

1. Field of the Invention

This invention relates generally to photography equipment, and more particularly to a camera telescope mounting apparatus for rifles.

2. Brief Description of the Prior Art

The use of photography equipment employing telephoto lenses for photographing wildlife is well known in the prior art. However, using a camera with a rifle in combination with a telescope has seen development, only recently by inventors.

Nielsen U.S. Pat. No. 3,545,356; and Hunt U.S. Pat. No. 3,709,124 appear to be the most pertinent references in the prior art.

Nielsen U.S. Pat. No. 3,545,356 discloses a cameratelescope in combination with a gun. To accomplish the object of the invention, a camera is combined in structure with a telescope and this combination is attached to a gun and arranged to photograph the image of the telescope. Control means adjacent to the hand grip of the gun operate the camera independently of the gun so that said camera can be used to take pictures while sighting the gun or when shooting, or both.

The present invention is an improvement over Nielsen's device where the camera image is taken using a single mirror located directly in the line of sight as viewed through the telescope. The present invention uses a split prism and two mirrors for reflecting the image away from the line of sight and into the camera; the image is viewed directly through the telescope, without interruption or obstruction by the apparatus.

Hunt U.S. Pat. No. 3,709,124 discloses a simulated rifle having a small camera mounted in its receiver portion, and an image-splitting mirror mounted above the receiver splits the image received from a telescopic sight so that the photographer can sight through the mirror and telescopic sight while the image is simultaneously reflected by the mirror to the camera lens. The picture may be taken by pulling the trigger of the rifle, which is connected to the camera shutter.

The present invention is an improvement over Hunt's device which uses a simulated rifle, whereas the present invention is intended for use with rifles which fire live ammunition. Hunt's device is for photographers, not for hunters nor hunting, and uses a single mirror.

The present invention is distinguished over the prior art in general, and these patents in particular, by an apparatus which includes a mount for use on a telescope in combination with a rifle. The mount is clamped onto the telescope, and has a camera attached to the top of the mount. A cable mechanism is attached at one end to the shutter release of the camera and at the other end to the trigger of the rifle. The camera is arranged to photograph the image received through the telescope and reflected through the mount. The cable mechanism provides means for controlling the operation of the camera. A housing is clamped onto the telescope and has an eyepiece which fits onto the eyepiece of the telescope and contains a split prism which is positioned in the eyepiece at an angle such that it can be seen through for viewing the image of the target received through the telescope The split prism has a reflective surface on one side which reflects the image of the target upwardly to a first surface mirror positioned in the housing above the split prism at an angle such that it receives the image reflected from the split prism, and then reflects the image forwardly to a second surface mirror. The second surface mirror is positioned at the forward end of the housing and at an angle such that it receives the image reflected from the first surface mirror, and then reflects the image upwardly to the camera lens. The image of the target is photographed when the trigger of the rifle is pulled.

SUMMARY OF THE INVENTION

It is therefore an object of the present invention to provide a combination of a camera with a telescopic sight for a rifle, wherein the telescope comprises the telephoto lens of the camera, and the camera is mounted on a housing which is clamped onto the telescope, and the latter is carried directly on the rifle.

The camera is thus always in readiness for operation, is easy to carry, and is relatively inexpensive since it uses the telescope as its telephoto lens. In addition, when the hunter aims the rifle at the target, he can shoot the target twice with one pull of the trigger—once with the rifle, and once with the camera.

It is another object of this invention to provide a combination camera/telescopic sight for mounting on rifles which employs operating means for the camera connected to the trigger of the rifle for operation on pulling the trigger.

Another object of this invention is to provide a combination camera/telescopic sight for rifles employing a novel embodiment which includes a camera mounted on top of a housing having an internal arrangement of a single split prism and a pair of mirrors.

Another object of this invention is to provide a novel arrangement of camera, housing, telescope and rifle wherein the apparatus allows an image to pass simultaneously through the telescope and, through the housing, to the camera shutter.

Another object of this invention is to provide a combination camera, housing, telescope apparatus for rifles which has a novel arrangement of image reflecting means.

A further object of this invention is to provide a combination camera, housing, telescope and rifle which has a novel arrangement of connection between the camera and telescope wherein the camera lies flat on top of the housing A still further object of this invention is to provide a combination camera, housing, telescope and rifle which has a cable attached at one end to the camera shutter release and at the other end to the trigger of the rifle.

Other objects of the invention will become apparent from time to time throughout the specification and claims as hereinafter related.

The above noted objects and other objects of the invention are accomplished by an apparatus which includes a mount for use on a telescope in combination with a rifle. The mount is clamped onto the telescope, and has a camera attached to the top of the mount. A cable mechanism is attached at one end to the shutter release of the camera and at the other end to the trigger of the rifle. The camera is arranged to photograph the image received through the telescope and reflected through the mount. The cable mechanism provides means for controlling the operation of the camera. A housing is clamped onto the telescope and has an eyepiece which fits onto the eyepiece of the telescope and contains a split prism which is positioned in the eyepiece at an angle such that it can be seen through for viewing the image of the target received through the telescope. The split prism has a reflective surface on one side which reflects the image of the target upwardly to a first surface mirror positioned in the housing above the split prism at an angle such that it receives the image reflected from the split prism, and then reflects the image forwardly to a second surface mirror. The second surface mirror is positioned at the forward end of the housing and at an angle such that it receives the image reflected from the first surface mirror, and then reflects the image upwardly to the camera lens. The image of the target is photographed when the trigger o the rifle is pulled.

BRIEF DESCRIPTION OF THE DRAWINGS

FIG. 1 is a side elevation of the camera mount for rifle scope apparatus in accordance with the present invention.

FIG. 2 is a top view of the apparatus of FIG. 1.

FIG. 3 is a cross-section view of the apparatus taken on section line 3—3 of FIG. 2.

FIG. 4 is a view in right elevation of the camera/telescopic sight apparatus shown in FIG. 1.

FIG. 5 is a cross-section view of the apparatus similar to FIG. 3, but showing an alternate camera mounting detail.

FIG. 6 is a view in right elevation of the camera/telescopic sight apparatus shown in FIG. 5.

DESCRIPTION OF THE PREFERRED EMBODIMENT

Referring to the drawings by numerals of reference, there is shown in FIGS. 1 and 2, a preferred embodiment of the camera mount 10 for mounting on a telescopic rifle sight in accordance with the present invention. The camera mount 10 is used with a conventional hunting rifle 11 having an upper portion 11A with a conventional (telescopic sight) telescope 20 thereon, and a trigger 11B for firing the gun and operating the camera. Rifle 11 fires live amunition.

The rifle 11 is a conventional rifle having a barrel, a stock with a grip portion, and a trigger 11B. In many instances, a telescope (telescopic sight) 20 is mounted o the rifle for sighting and firing at distant targets. These telescopes in the usual structure have an outer cylindrical casing with an open or prism end and an eyepiece or viewing end, as well as an arrangement of lenses. Such telescopes are secured to the rifle 11 in many different ways, one of which is illustrated in FIG. 1 and comprises a pair of clamp brackets.

According to the present invention, a still picture camera 30 is combined with the usual rifle mounted telescope 20 and a housing 12 is provided for transferring the image of the target received through the telescope to the camera.

Referring now to FIGS. 3 and 4, the camera mount 10 includes an L-shaped hollow housing 12 having a horizontal portion 12A secured on the telescope 20 and a vertically extending portion 12B extending across the eyepiece 20A of the telescope. The vertically extending portion 12B has an eye piece 12C at its lower end aligned with the eyepiece 20A of the telescope and fits thereon for viewing the image received through the telescope.

A split prism 16 is contained in the housing eyepiece 12C and positioned at an angle for viewing the image of the target directly through the eyepiece, and reflecting the image of the target received through the telescope upwardly. The image is neither distorted nor interrupted by the split prism 16 which has a reflective surface on one side which reflects the image of the target upwardly. A first surface mirror 18A is contained in the housing above the split prism 16 and positioned at an angle to receive the image of the target reflected from split prism 16 and reflect the image forwardly. A second surface mirror 18B is contained at the forward end of the housing and positioned at an angle to receive the image of the target reflected from first surface mirror 18A and reflect the image upwardly.

In the embodiment of FIGS. 3 and 4, the housing 12 has a hollow vertical portion 12D extending upwardly from the horizontal portion 12A above the second surface mirror 18B onto which the camera 30 is mounted. The end of the vertically extending portion 12D may be provided with external threads whereby the threaded lens portion of the camera may be threadedly connected thereon when the lens or the lens cover of the camera is removed. One or more threaded adapters 12E may also be provided to adapt the vertical portion 12D to receive various makes and models of cameras.

Alternatively, as shown in FIGS. 5 and 6, the housing 12 has an aperture 12F through the top wall of the horizontal portion 12A and the camera 30 is provided with sidewall extensions 33 which engage the housing 12. The ends of the extensions are is contoured (FIG. 6) to providing a tight, lightproof seating connection with the housing. The camera is thus attached to the housing by screws 31 at the extensions 33, or other suitable fasteners as needed.

The housing 12 is clamped to the telescope by clamp members 14 which extend downwardly from opposite sides of the housing to be received on the telescope 20. The clamp members are secured to the telescope by bolting or other conventional clamping or fastener means.

Camera 30 is of conventional design and construction, and is mounted on the top of housing 12 above second surface mirror 18B, as described above, and is positioned such that it receives the image reflected therefrom. The film 32 in camera 30 has a portion lying in a plane parallel to the axis of the telescope. The camera 30 has a conventional shutter release 30A onto which one end of a remotely operated cable mechanism 30B is attached. The other end of the remote cable mechanism has a conventional plunger device engaged on the rifle trigger 11B such that the shutter release 30A is activated simultaneously with the firing of the rifle.

OPERATION

The operation of the camera mount for rifle scope apparatus 10 should be obvious from the description of the preferred embodiment but will be stated herein for clarity.

Camera 30 is loaded with film 32 and secured to the housing 12, the housing 12 is clamped to the telescope 20, and the combination is secured to the rifle 11. The rifle 11 is loaded with suitable ammunition.

The rifle 11 in combination with telescope 20, and camera 30, is aimed at the target. The image of the target is received through the telescope and is reflected off the split prism 16 upwardly, then reflected off the first surface mirror 18A forwardly, then reflected off the second surface mirror 18B upwardly, finally reaching the camera lens. The hunter observes the image of the target by looking through the eyepiece 12A. When the target is sighted and the hunter is ready to shoot, the trigger 11B is pulled. Rifle 11 fires the bullet at the target and simultaneously, cable 30B remotely operates the camera shutter release 30A of camera 30. The image of the target is photographed on film 32.

While this invention has been described fully and completely with special emphasis upon a preferred embodiment, it should be understood that, within the scope of the appended claims, the invention may be practiced otherwise than as specifically described herein.

I claim:

1. The combination with a rifle having an upper portion with a telescope mounted thereon with an eyepiece for viewing at close range the target of the rifle and a trigger for firing said rifle, of
   an apparatus for mounting a camera on the telescope for photographing the image of the target when the trigger of the rifle is pulled comprising
   an L-shaped hollow housing having a horizontal portion secured on said telescope and a vertically extending portion extending across the eyepiece of said telescope,
   said vertically extending portion having an eyepiece at its lower end aligned with the eyepiece of said telescope for viewing,
   a split prism contained in said housing eyepiece positioned for viewing the image of the target through said eyepiece, and reflecting the image of the target upwardly,
   a first surface mirror in said housing positioned above said split prism for receiving the image of the target reflected from said split prism, and reflecting said image forwardly,
   a second surface mirror contained in said housing positioned at the forward end thereof for receiving the image of the target reflected from said first surface mirror, and reflecting said image upwardly,
   a camera mounted on said housing having a shutter mechanism positioned to photograph the image of the target reflected from said second surface mirror,
   control means operatively connected to said trigger and arranged to operate said camera, and
   said control means for the camera being remotely operated by the trigger of said rifle whereby said camera is operated simultaneously with the firing of said rifle.

2. A combination according to claim 1 in which:
   said control means for operating said camera is a cable operator mechanism interconnecting said trigger and said camera.

3. A combination according to claim 1 in which:
   said split prism is contained in said housing eyepiece positioned centrally therein and placed to pas light through to said housing eyepiece and to reflect light upwardly to said first surface mirror.

4. A combination according to claim 1 in which:
   said L-shaped hollow housing has a horizontal portion secured on said telescope and a vertically extending portion with cylindrical openings extending across the eyepiece of said telescope,
   said split prism being positioned between said cylindrical openings to receive light from said telescope and pass light to said housing eyepiece.

5. A combination according to claim 1 in which:
   said camera is mounted on the top of said housing, has a shutter mechanism positioned to photograph the image of the target reflected from said second surface mirror, and
   said camera is located above said second surface mirror.

6. A combination according to claim 1 in which:
   said camera is mounted on the top of said housing, has a shutter mechanism positioned to photograph the image of the target reflected from said second surface mirror,
   said camera is located above said second surface mirror, and
   said camera is removably mounted on said housing.

7. A combination according to claim 1 in which:
   said control means for operating said camera is a cable operator mechanism interconnecting said trigger and said camera, and
   said cable operator mechanism is located in a position attached at one end to the trigger of the rifle, at the other end to the shutter release of the camera, and extends across the housing, telescope and rifle.

8. A combination according to claim 1 wherein:
   said telescope has an eyepiece,
   said housing has an eyepiece configured for attachment to said telescope eyepiece,
   said camera is mounted on said housing as an extension of said telescope to photograph the image of the target from said second surface mirror,
   a viewing aperture in said housing eyepiece in the line of sight of viewing through said telescope, and
   stationary reflecting means in said housing directing the image viewable through said telescope to said camera.

9. A combination according to claim 1 in which:
   said control means for operating said camera is a cable operator mechanism interconnecting said trigger and said camera, and
   said split prism is contained in said housing eyepiece positioned centrally therein and placed to pass light through to said housing eyepiece and to reflect light upwardly to said first surface mirror.

10. A combination according to claim 1 in which:
    said control means for operating said camera is a cable operator mechanism interconnecting said trigger and said camera,
    said L-shaped hollow housing has a horizontal portion secured on said telescope and a vertically extending portion with cylindrical openings extending across the eyepiece of said telescope, and
    said split prism is contained in said housing eyepiece positioned centrally therein and placed to pass light through to said housing eyepiece and to reflect light upwardly to said first surface mirror.

11. A combination according to claim 1 in which:
    said control means for operating said camera is a cable operator mechanism interconnecting said trigger and said camera,
    said L-shaped hollow housing has a horizontal portion secured on said telescope and a vertically extending portion with cylindrical openings extending across the eyepiece of said telescope,
    said split prism is contained in said housing eyepiece positioned centrally therein and placed to pass light through to said housing eyepiece and to reflect light upwardly to said first surface mirror,
    said camera is mounted on the top of said housing, has a shutter mechanism positioned to photograph the image of the target reflected from said second surface mirror, and said camera is located above said second surface mirror.

12. A combination according to claim 1 in which:
said control means for operating said camera is a cable operator mechanism interconnecting said trigger and said camera,
said L-shaped hollow housing has a horizontal portion secured on said telescope and a vertically extending portion with cylindrical openings extending across the eyepiece of said telescope,
said split prism is contained in said housing eyepiece positioned centrally therein and placed to pass light through to said housing eyepiece and to reflect light upwardly to said first surface mirror,
said camera is mounted on the top of said housing, has a shutter mechanism positioned to photograph the image of the target reflected from said second surface mirror,
said camera is located above said second surface mirror, and
said camera is removably mounted on said housing.

13. A combination according to claim 1 in which:
said control means for operating said camera is a cable operator mechanism interconnecting said trigger and said camera,
said L-shaped hollow housing has a horizontal portion secured on said telescope and a vertically extending portion with cylindrical openings extending across the eyepiece of said telescope,
said split prism is contained in said housing eyepiece positioned centrally therein and placed to pas light through to said housing eyepiece and to reflect light upwardly to said first surface mirror,
said camera is mounted on the top of said housing, has a shutter mechanism positioned to photograph the image of the target reflected from said second surface mirror,
said camera is located above said second surface mirror, said camera is removably mounted on said housing,
said control means for operating said camera is a cable operator mechanism interconnecting said trigger and said camera, and
said cable operator mechanism is located in a position attached at one end to the trigger of the rifle, at the other end to the shutter release of the camera, and extends across the housing, telescope and rifle.

14. A camera mount for a rifle having an upper portion with a telescope mounted thereon with an eyepiece for viewing at close range the target of the rifle and a trigger for firing said rifle, for photographing the image of the target when the trigger of the rifle is pulled comprising
an L-shaped hollow housing having a horizontal portion secured on said telescope and a vertically extending portion extending across the eyepiece of said telescope,
said vertically extending portion having an eyepiece at its lower end aligned with the eyepiece of said telescope for viewing,
a split prism contained in said housing eyepiece positioned for viewing the image of the target through said eyepiece, and reflecting the image of the target upwardly,
a first surface mirror in said housing positioned above said split prism for receiving the image of the target reflected from said split prism, and reflecting said image forwardly,
a second surface mirror contained in said housing positioned at the forward end thereof for receiving the image of the target reflected from said first surface mirror, and reflecting said image upwardly,
a camera mounted on said housing having a shutter mechanism positioned to photograph the image of the target reflected from said second surface mirror,
control means for operative connection to the rifle trigger and arranged to operate said camera, and
said control means for the camera being remotely operable by the trigger of said rifle whereby said camera is operated simultaneously with the firing of said rifle.

15. A camera mount according to claim 14 in which:
said control means for operating said camera is a cable operator mechanism interconnecting said trigger and said camera.

16. A camera mount according to claim 14 in which:
said split prism is contained in said housing eyepiece positioned centrally therein and placed to pass light through to said housing eyepiece and to reflect light upwardly to said first surface mirror.

17. A camera mount according to claim 14 in which:
said L-shaped hollow housing has a horizontal portion secured on said telescope and a vertically extending portion with cylindrical openings extending across the eyepiece of said telescope,
said split prism being positioned between said cylindrical openings to receive light from said telescope and pass light to said housing eyepiece.

18. A camera mount according to claim 14 in which:
said camera is mounted on the top of said housing, has a shutter mechanism positioned to photograph the image of the target reflected from said second surface mirror, and
said camera is located above said second surface mirror.

19. A camera mount according to claim 14 in which:
said camera is mounted on the top of said housing, has a shutter mechanism positioned to photograph the image of the target reflected from said second surface mirror,
said camera is located above said second surface mirror, and
said camera is removably mounted on said housing.

20. A camera mount according to claim 14 in which:
said control means for operating said camera is a cable operator mechanism interconnecting said trigger and said camera, and
said cable operator mechanism is located in a position attached at one end to the trigger of the rifle, at the other end to the shutter release of the camera, and extends across the housing, telescope and rifle.

21. A camera mount according to claim 14 wherein:
said telescope has an eyepiece,
said housing has an eyepiece configured for attachment to said telescope eyepiece,
said camera is mounted on said housing as an extension of said telescope to photograph the image of the target from said second surface mirror,
a viewing aperture in said housing eyepiece in the line of sight of viewing through said telescope, and
stationary reflecting means in said housing directing the image viewable through said telescope to said camera.

22. A camera mount according to claim 14 in which:

said control means for operating said camera is a cable operator mechanism interconnecting said trigger and said camera, and said split prism is contained in said housing eyepiece positioned centrally therein and placed to pas light through to said housing eyepiece and to reflect light upwardly to said first surface mirror.

23. A camera mount according to claim 14 in which:

said control means for operating said camera is a cable operator mechanism interconnecting said trigger and said camera, said L-shaped hollow housing has a horizontal portion secured on said telescope and a vertically extending portion with cylindrical openings extending across the eyepiece of said telescope, and said split prism is contained in said housing eyepiece positioned centrally therein and placed to pass light through to said housing eyepiece and to reflect light upwardly to said first surface mirror.

24. A camera mount according to claim 14 in which:

said control means for operating said camera is a cable operator mechanism interconnecting said trigger and said camera, said L-shaped hollow housing has a horizontal portion secured on said telescope and a vertically extending portion with cylindrical openings extending across the eyepiece of said telescope, said split prism is contained in said housing eyepiece positioned centrally therein and placed to pass light through to said housing eyepiece and to reflect light upwardly to said first surface mirror, said camera is mounted on the top of said housing, has a shutter mechanism positioned to photograph the image of the target reflected from said second surface mirror, and said camera is located above said second surface mirror.

25. A camera mount according to claim 14 in which:

said control means for operating said camera is a cable operator mechanism interconnecting said trigger and said camera, said L-shaped hollow housing has a horizontal portion secured on said telescope and a vertically extending portion with cylindrical openings extending across the eyepiece of said telescope, said split prism is contained in said housing eyepiece positioned centrally therein and placed to pass light through to said housing eyepiece and to reflect light upwardly to said first surface mirror, said camera is mounted on the top of said housing, has a shutter mechanism positioned to photograph the image of the target reflected from said second surface mirror, said camera is located above said second surface mirror, and said camera is removably mounted on said housing.

26. A camera mount according to claim 14 in which:

said control means for operating said camera is a cable operator mechanism interconnecting said trigger and said camera, said L-shaped hollow housing has a horizontal portion secured on said telescope and a vertically extending portion with cylindrical openings extending across the eyepiece of said telescope, said split prism is contained in said housing eyepiece positioned centrally therein and placed to pass light through to said housing eyepiece and to reflect light upwardly to said first surface mirror, said camera is mounted on the top of said housing, has a shutter mechanism positioned to photograph the image of the target reflected from said second surface mirror, said camera is located above said second surface mirror, said camera is removably mounted on said housing, said control means for operating said camera is a cable operator mechanism interconnecting said trigger and said camera, and said cable operator mechanism is located in a position attached at one end to the trigger of the rifle, at the other end to the shutter release of the camera, and extends across the housing, telescope and rifle.

* * * * *